United States Patent [19]

Wiley, deceased

[11] Patent Number: 4,825,215

[45] Date of Patent: Apr. 25, 1989

[54] RADIOMETRIC IMAGER HAVING A FREQUENCY-DISPERSIVE LINEAR ARRAY ANTENNA

[75] Inventor: Carl A. Wiley, deceased, late of Westchester, Calif., by Jean B. Wiley, administratrix

[73] Assignee: Hughes Aircraft Company, Los Angeles, Calif.

[21] Appl. No.: 881,751

[22] Filed: Jul. 3, 1986

[51] Int. Cl.$^4$ ............................................. G01S 3/02
[52] U.S. Cl. ................................. 342/351; 342/424
[58] Field of Search ............... 342/351, 425, 78, 156, 342/25, 424, 375; 324/27 C, 77 CS, 77 B

[56] References Cited

U.S. PATENT DOCUMENTS

| | | | |
|---|---|---|---|
| 3,787,857 | 1/1974 | Lazarichik et al. | 342/351 |
| 3,883,876 | 4/1975 | Roeder et al. | 342/425 |
| 3,886,555 | 5/1975 | Royal | 342/425 |
| 4,131,891 | 12/1978 | Stavis | 342/351 |
| 4,150,379 | 4/1979 | Connors | 342/425 X |
| 4,284,895 | 8/1981 | Morgan et al. | 378/9 |
| 4,499,470 | 2/1985 | Stacey | 342/351 |
| 4,654,666 | 3/1987 | Wiley | 342/375 X |
| 4,724,439 | 2/1988 | Wiley et al. | 342/351 |

FOREIGN PATENT DOCUMENTS

| | | |
|---|---|---|
| 2010494 | 6/1979 | Fed. Rep. of Germany . |
| 3139189 | 4/1983 | Fed. Rep. of Germany . |
| 85/05188 | 11/1985 | PCT Int'l Appl. . |
| 85/05189 | 11/1985 | PCT Int'l Appl. . |

OTHER PUBLICATIONS

"A Radiometer System of High Absolute Accuracy" Mar. 1978 Conference Paper on Earth Observation from Space and Management . . . Paris.

R. K. Moore et al., "Scanning Spaceborne Synthetic Aperture Radar with Integrated Radiometer," Transactions on Aerospace and Electronic Systems, IEEE (New York), vol. AES-17, No. 3, May 1981, pp. 410–420.

J. M. Schuchardt et al., "The Coming of mm-Wave Forward Looking Imaging Radiometers," *Microwave Journal (Dedham, Mass.)*, vol. 24, No. 6, pp. 45–62.

*Primary Examiner*—Thomas H. Tarcza
*Assistant Examiner*—Tod R. Swann
*Attorney, Agent, or Firm*—S. M. Mitchell; M. J. Meltzer; A. W. Karambelas

[57] ABSTRACT

A radiometric imager for providing a series of registered images of a scene, each image corresponding to the radiation pattern for a unique, narrow frequency band. One embodiment includes a single frequency-dispersive linear antenna providing an output signal based on a series of conical fanbeams, with the antenna being controllably rocked about one axis and rotated about a perpendicular axis such that each fanbeam intersects each segment of the scene a plurality of times. In alternative embodiments, the imager includes a second frequency-dispersive linear antenna arranged in parallel with the first antenna to produce a fanbeam interferometer. Rocking movement of the two antennas coupled with either translation of the two antennas, rotation of the two antennas about an axis parallel with the antenna axes, or movement of the two antennas toward and away from each other, provides sufficient data to permit creation of the registered images.

18 Claims, 4 Drawing Sheets

RADIOMETRIC IMAGER HAVING A FREQUENCY-DISPERSIVE LINEAR ARRAY ANTENNA

BACKGROUND OF THE INVENTION

This invention relates generally to radiometric imagers, and, more particularly, to radiometric imagers that determine the frequency spectrum of a two-dimensional scene using a line source or linear array antenna and fanbeam inversion.

There are numerous practical applications for high-resolution radiometric imaging in aerospace, meteorological, oceanographic and astronomical fields. Radiometers are particularly well suited for the mapping of terrestrial, planetary and oceanic features, the measurement of atmospheric water vapor, rain and sea surface temperature, and the assessment of hydrographic phenomena and surface conditions beneath clouds or rain.

One prior microwave radiometer for providing a two-dimensional image of a scene using a line source antenna that scans the scene with a series of fanbeams is described in a copending and commonly-assigned U.S. patent application, Ser. No. 607,869, filed May 7, 1984, in the names of Carl A. Wiley and Charles R. Edelsohn, and entitled "Microwave Radiometer Using Fanbeam Inversion." This type of radiometer is referred to as "SPINRAD," which is an acronym for spinning radiometer. One embodiment disclosed in the copending application includes a mechanically-scanned pillbox antenna, while another embodiment includes an electronically-scanned, rotatable linear array antenna. In both cases, the antenna signals are suitably processed to reconstruct a single radiometric image of the scene being scanned.

Many applications for radiometric imaging require knowledge of the frequency spectrum of each segment of the scene being scanned. In the past, this has been achieved using a line source antenna whose beam direction does not change over the required frequency range, i.e., a non-frequency-dispersive antenna. A bank of bandpass filters divides the antenna output signal into a number of separate frequency bins, and a set of registered images of the scene is then produced using the data contained in the various frequency bins. Many line source antennas used in such systems are bulky and cumbersome in structure, such as the Rotman lens or planar reflector (i.e., pillbox). Other line source antennas, such as the standing-wave array, are small and light as compared to lenses and reflectors, but have unduly limited bandwidths.

It should, therefore, be appreciated that there is a need for a radiometric imager that can provide a spectral image of a scene over a wide frequency range, without being unduly bulky or cumbersome and without having an unduly limited frequency range. The present invention fulfills this need.

SUMMARY OF THE INVENTION

This invention is embodied in a radiometric imager, and a related method, that determines the frequency spectrum of every segment of a two-dimensional scene being imaged using a lightweight, frequency-dispersive linear array antenna. The antenna provides an output signal in accordance with radiation received along a series of conical fanbeams that represent unique frequencies extending over a predetermined frequency range. These fanbeams intersect the scene to be scanned in a series of spaced-apart conic sections. Rocking means are included for controllably rocking the antenna about a rocking axis substantially perpendicular to the antenna's axis and parallel to the scene, such that the conical fanbeams scan the scene in a predetermined fashion. The antenna output signal thereby contains data representing the receipt of all radiation in the predetermined frequency range, from all segments of the scene. This data is stored in data storage means. In accordance with the invention, the radiometric imager further includes supplementary movement means for controllably moving the antenna in a further fashion, to resolve ambiguities in the stored data. Data processing means can thereafter process the stored data to determine the frequency spectrum of all segments of the scene.

In one embodiment of the invention, the supplementary movement means includes means for controllably rotating the antenna about an axis substantially perpendicular to both the antenna axis and the rocking axis. The rocking means and the rotating means thereby cooperate with each other such that each conic section intersects each segment of the scene a plurality of times. The rotating means preferably rotates the antenna over a substantially 360-degree range for each incremental rocking position.

In other embodiments of the invention, the radiometric imager further includes a second frequency-dispersive linear array antenna, substantially similar to the first antenna. The two antennas are arranged in spaced, parallel relationship with each other, such that they form an interferometer having a series of conical fanbeams for scanning the scene. This type of imager is referred to as "RADSAR," which is an acronym for radiometric synthetic aperture radar.

In these other embodiments, the supplementary movement means can take several forms. For example, it can translate the first and second antennas relative to the scene in a direction substantially perpendicular to the antenna axes and parallel to the scene. Alternatively, the supplementary movement means can include means for controllably rotating the two antennas about an axis parallel with their longitudinal axes. In this way, the effective spacing between the two antennas along an axis perpendicular to the direction to the scene is controllably varied. In still another embodiment, the supplementary movement means can include means for controllably moving the two antennas toward and away from each other, while maintaining their parallel relationship. The effective spacing between the two antennas along an axis perpendicular to the direction to the scene is thereby controllably varied.

The data processing means can conveniently produce a plurality of registered images of the scene, each image being based on the stored data for a unique frequency band in the predetermined frequency range. These images can be conveniently produced from the stored data using a modified Radon transform algorithm.

Other aspects and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
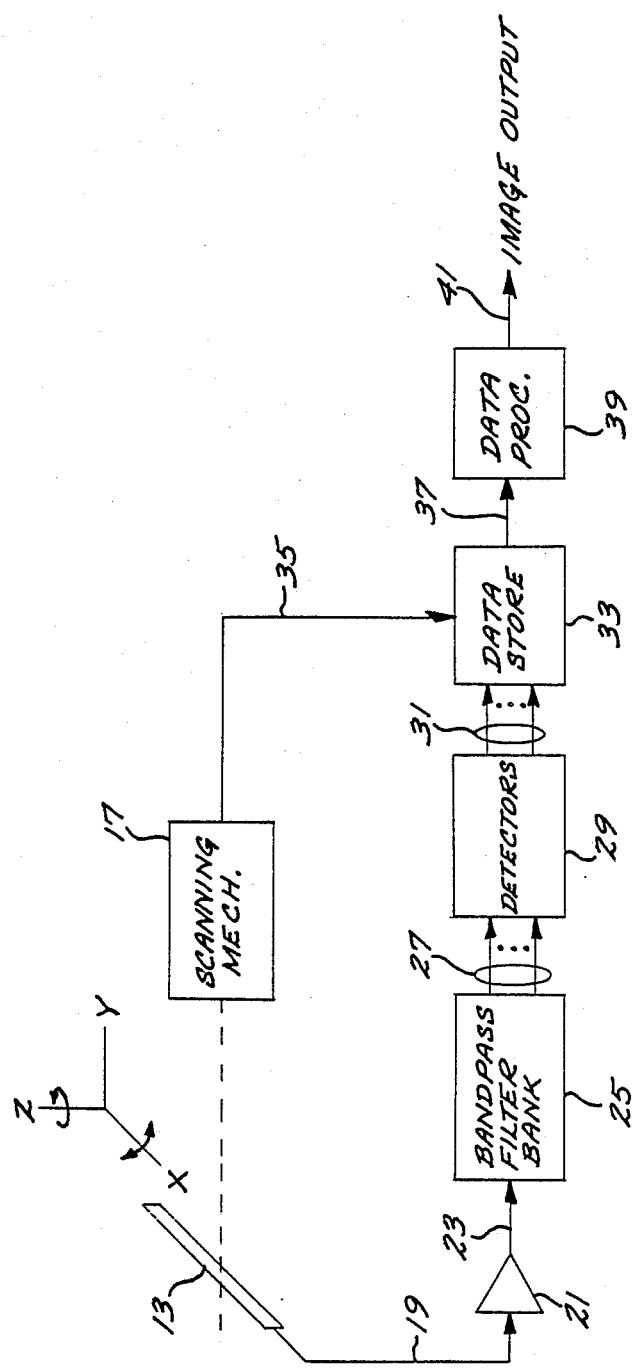
FIG. 1 is a simplified block diagram of a radiometric imager in accordance with one embodiment of the invention.
Figure 2:
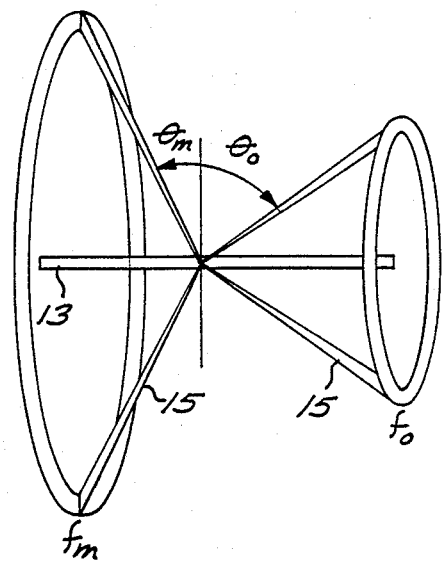
FIG. 2 is a schematic diagram of the frequency-dispersive, linear array antenna of FIG. 1, depicting the conical fanbeams for two separate frequencies.
Figure 3:
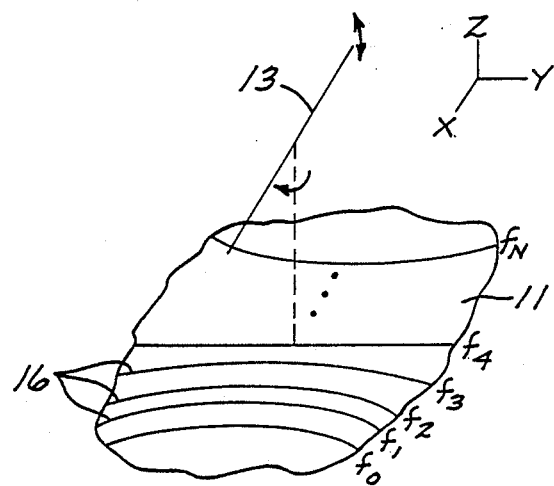
FIG. 3 is a schematic diagram of the linear array antenna of FIG. 1, depicting the intersections of several of its conical fanbeams with a scene to be scanned.

With reference now to the drawings, and particularly to FIGS. 1-3, there is shown a first embodiment of a radiometric imager for scanning a scene 11 (FIG. 3) and producing a set of registered images of the scene, each image representing radiation received in a unique, narrow frequency band. The radiometric imager includes a single frequency-dispersive linear array antenna 13, which generates an output signal based on radiation received from a series of conical fanbeams. Two exemplary fanbeams are identified by the reference numeral 15 in FIG. 2. Each fanbeam collects radiation in a unique, narrow frequency band, and contributes to the output signal without regard to the circumferential direction from which the radiation is received. These frequency bands range from a low frequency of $F_O$, at one extreme angle, to a high frequency $F_n$, at an opposite extreme angle. The fanbeams can be either a series of discrete, conical beams or a continuum of beams.

The antenna 13 is preferably a conventional traveling-wave linear array, which includes an elongated feeder, with an input port at one end and a load at the other end. Radiators are coupled to the feeder along its length.

As best depicted in FIG. 3, the conical fanbeams 15 received by the linear antenna 13 intersect the scene 11 in a series of spaced, conic sections 16. If the scene is precisely flat, these conic sections are, in fact, hyperbolas. If the scene forms part of the spherical surface of the earth, however, the conic sections form more complicated curves. For small fields of view, however, hyperbolas serve as good approximations for these curves.

In accordance with the invention, the radiometric imager includes a scanning mechanism 17 (FIG. 1) for controllably moving the linear antenna 13 through a series of positions, such that its fanbeams 15 scan the scene 11 and each beam intersects each small segment of the scene a plurality of times. In the embodiment of FIGS. 1-3, this mechanical scanning is achieved by controllably rotating the antenna about an axis substantially aligned with the direction toward the scene, i.e., the Z axis in FIG. 3, and by rocking the antenna about an axis that is perpendicular to the antenna axis and parallel with the scene, i.e., the Y axis in FIG. 3.

Figure 4A:
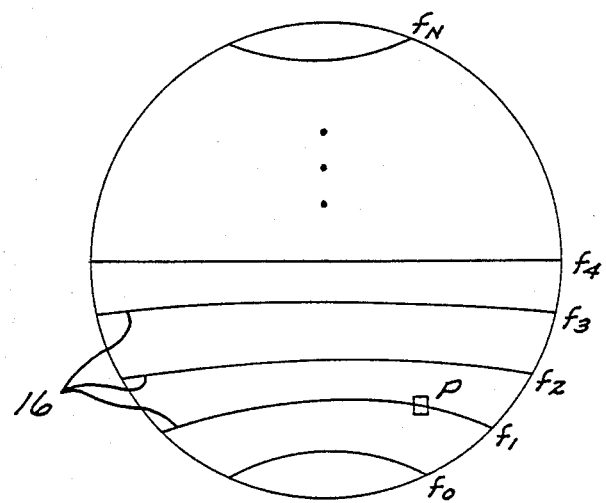
FIGS. 4(a) and 4(b) depict two exemplary sets of fanbeam intersections with the scene to be imaged, all at the same frequency $F_0$, for two exemplary rotational positions and several exemplary rocking positions for the fanbeam.
Figure 4B:
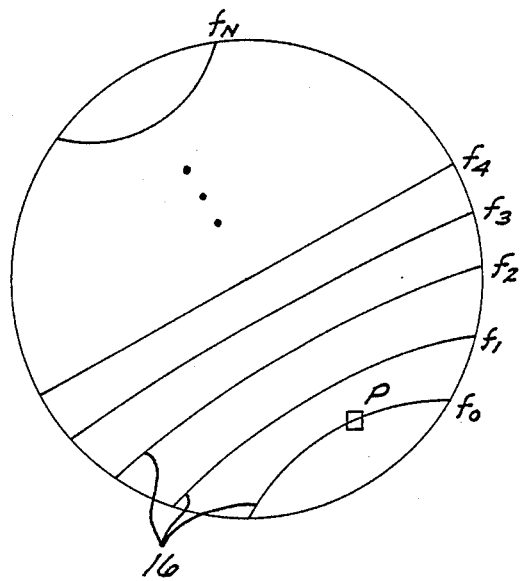

For each incremental rocking position, the antenna 13 is rotated through its entire 360-degree range of rotation. The resulting data can be organized into a set of scans for each frequency, at each incremental rotational position. FIGS. 4(a) and 4(b) depict two such sets of scans, both for the $F_O$ fanbeam. FIG. 4(a) depicts the $F_O$ fanbeam intersections for several exemplary rocking positions, for one specific rotational position, while FIG. 4() depicts the $F_O$ fanbeam intersections for the same exemplary rocking positions, for another rotational position. In each rotational position, every segment in the scene 11 being scanned is intersected just one time by each fanbeam. The data contained in the output signal generated while the antenna is moved through its prescribed rocking and rotational movements is stored for subsequent processing.

With reference now to FIG. 1, there is shown a simplified block diagram of the radiometric imager of the first embodiment of the invention. The antenna output signal is transmitted on line 19 from the antenna 13 to an amplifier 21, for suitable amplification. The amplified signal, in turn, is supplied on line 23 to a bank of bandpass filters 25, one filter for each fanbeam. The resulting filtered signals are supplied on lines 27 to a bank of detector circuits 29 for detecting the signal amplitudes. The resulting detected amplitudes represent an integration of the intensity of radiation received by the antenna in the n successive narrow frequency bands, over the conic sections 16 defined by the intersections of the fanbeams 15 with the scene 11 being scanned.

The n intensity signals produced by the bank of detector circuits 29 are supplied on lines 31 to a data storage device 33, which stores the data for subsequent processing. Simultaneously, data indicating the instantaneous rocking and rotational positions of the antenna 13 is supplied to the data storage device on line 35 from the scanning mechanism 17. This latter data is essential for proper interpretation of the antenna data. The stored data is subsequently output on line 37 to a data processing device 39, for suitable processing to determine the spectrum of each small segment in the scene 11 being scanned. This results in a series of registered, two-dimensional images, for output on line 41, each image representing the radiation received in a unique narrow frequency band.

The intensity of radiation emitted by each segment of the scene 11, at each discrete frequency ranging from $F_O$ to $F_n$, is determined by appropriately collapsing all of the stored data for each respective segment. In particular, for each narrow frequency band, the radiation intensity measurements for all of the scans that pass through a given segment are brought together and averaged. The resulting average is an accurate measurement of the intensity of radiation emitted by that particular segment. This data collapsing procedure is described in detail in the copending U.S. patent application, Serial No. 607,869, referred to above, which is incorporated by reference. The procedure is, in fact, a multiplexed version of a fanbeam inversion procedure described in the application, with the described procedure being repeated n times, one for each narrow frequency band in the predetermined frequency range $F_O$ to $F_n$.

For each of the n narrow frequency bands (i.e., $F_O$ to $F_n$), the radiation received from the conic section 16 defined by the intersection of the corresponding fanbeam 15 with the scene 11 forms a function called the profile or projection of the scene, as the fanbeam scans the scene. If the conic section were, in fact, a straight line, this function would be a Radon transform of the scene, which is well known by those skilled in the art. Because the conic sections are not straight lines, however, the Radon transform must be modified slightly, to be useful in mathematically processing the data. Such a modified Radon transform is described in detail in the copending patent application, identified above.

Figure 5:
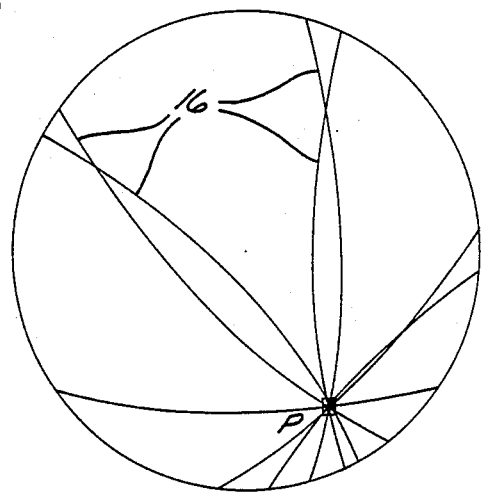
FIG. 5 depicts a plurality of $F_0$ fanbeam intersections with a single pixel P in the scene to be imaged, for a plurality of rotational positions for the fanbeam (i.e., a SPINRAD scheme)

FIG. 5 depicts the set of conic sections for one particular frequency (i.e., $F_O$) that all intersect a particular scene segment P for a SPINRAD configuration. If the $F_O$ radiation measurements for all of these conic sections 16 average to a high value, it is deduced that these high values are attributable to a correspondingly high-intensity emitter of radiation located in this segment of the scene. Similarly, if all of these intersecting conic sections average to a relatively low value, it is deduced that there is a correspondingly low-intensity of $F_O$ radiation received from this segment.

It will be appreciated that the relatively small number of intersecting conic sections for the scene segment P in FIG. 5 is exemplary, only. The antenna movement can be controlled to provide any desired level of resolution. For example, the rocking motion can extend over a 40-degree range, in ½-degree increments, and the rotational motion can extend over a 360-degree range, similarly in ½-degree increments. This would yield over 1,000 intersecting conic sections for each segment of the scene and each narrow frequency band.

Figure 6:
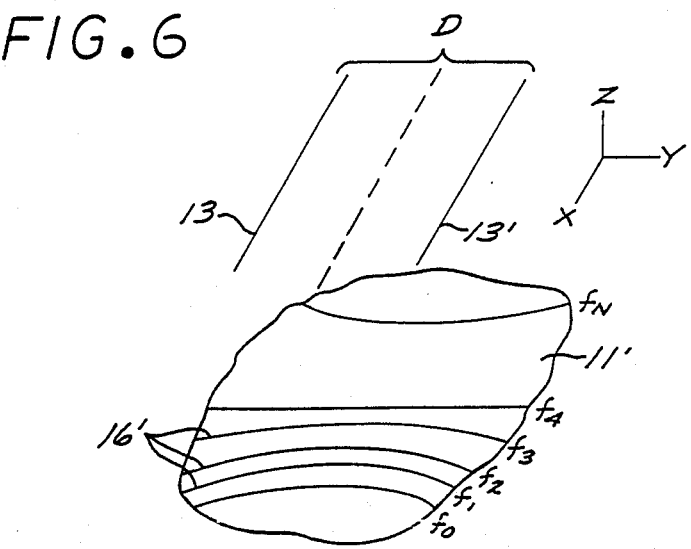
FIG. 6 is a simplified schematic diagram of an alternative embodiment of the invention, which includes two frequency-dispersive linear array antennas (i.e., RADSAR), arranged in spaced parallel relationship to each other such that they form a scanning interferometer.

FIG. 6 depicts an alternative embodiment of the invention, which includes a second frequency-dispersive linear array antenna 13', arranged in spaced, parallel relationship with the first antenna 13. This is referred to as a RADSAR configuration. The conical fanbeams of the two antennas are substantially aligned with each other, at distances large compared to the distance D between the antennas, such that the two antennas form an interferometer for scanning the scene 11'. Each fanbeam has a predetermined interferometric lobe pattern, which is determined in accordance with its frequency and the spacing D between the antennas. The signals from the two antennas are suitably combined (e.g., multiplied together), to produce a set of profiles (one for each frequency) representing the radiation emitted by predetermined conic sections 16' in the scene, multiplied by the lobe pattern for the corresponding frequency.

The FIG. 6 embodiment is similar to the embodiment of FIGS. 1-3 in that the two antennas are controllably rocked about an axis perpendicular to the antenna axes and parallel to the scene being scanned, i.e., the Y axis. However, instead of rotating the antennas about an axis aligned with the direction toward the scene, as was done in the embodiment of FIGS. 1-3, this embodiment moves the antennas in either of several different fashions, all functioning to translate the interferometric fanbeams relative to the scene.

In one example of the interferometer embodiment of the invention, the two antennas 13 and 13' are caused to translate relative to the scene 11' along an axis perpendicular to the antenna axes and parallel to the scene, i.e., the Y axis in FIG. 6, while maintaining a fixed distance D between the two antennas. This latter movement can be conveniently accomplished by mounting the two antennas on one or two satellites in non-geostationary orbit. Since each fanbeam forms an interferometer, with its response varying in a predetermined fashion as a function of angular direction, this translating movement can be used to resolve ambiguities in the angular direction from which a signal is received at any specific time. As in the embodiment of FIGS. 1-3, a suitable procedure for processing the data accumulated by this embodiment of the invention is described in detail in the copending patent application, identified above. The procedure is a multiplexed version of the procedure described in the application, with the described procedure being repeated n times, one for each narrow frequency band.

In two further examples of the interferometer embodiment of the invention, the two antennas 13 and 13' are moved in such a fashion as to controllably change their effective spacing along an axis perpendicular to the direction to the scene 11'. In one of these examples, the antennas are made to rotate together about an axis parallel with their own axes, i.e., the X axis in FIG. 6. In the other example, the two antennas are controllably moved toward or away from each other, i.e., along the Y axis in FIG. 6. In either case, the controllably varied distance between the two antennas changes the interferometer pattern of each fanbeam and permits the accumulation of data that can be used to resolve ambiguities in the specific direction to any source of radiation the antennas detect. Again, a suitable procedure for collapsing this data and producing a set of registered images of the scene, one such image for each frequency, is provided in the copending patent application, identified above. The procedure to be followed is a multiplexed version of a one-dimensional aperture-synthesis procedure described in the application, with the described procedure being repeated n times, one for each narrow frequency band.

It should be appreciated from the foregoing description that the present invention provides an improved radiometric imager that provides a series of registered images of a scene, each image corresponding to the radiation pattern received for a unique, narrow frequency band. One embodiment includes a single frequency-dispersive linear array antenna providing an output signal based on a series of conical fanbeams, with the antenna being controllably rocked about one axis and rotated about a perpendicular axis such that each fanbeam intersects each segment of the scene a plurality of times. In alternative embodiments, the radiometric imager includes a second frequency-dispersive linear antenna arranged in parallel with the first antenna, to produce a fanbeam interferometer. Rocking movement of the two antennas, coupled with either translation of the two antennas, rotation of the two antennas about an axis parallel with the antenna axes, or movement of the two antennas toward and away from each other, provides sufficient data to permit creation of the registered images.

Although the present invention has been described in detail with reference to the presently-preferred embodiments, those of ordinary skill in the art will appreciate that various modifications can be made without departing from the invention. Accordingly, the invention is defined only by the following claims.

I claim:

1. A radiometric imager for determining the frequency spectrum of a two-dimensional scene, comprising:

a frequency-dispersive, linear antenna having a longitudinal axis and providing an output signal in accordance with radiation received along a series of conical fanbeams, wherein the fanbeams represent unique frequencies extending over a predetermined frequency range and intersect a two-dimensional scene in a series of spaced-apart conic sections;

rocking means for controllably rocking the linear antenna about a rocking axis substantially perpendicular to the antenna axis and parallel to the scene, to cause the spaced-apart conic sections to scan the scene in a predetermined fashion, such that the output signal contains data representing the receipt of all radiation in the predetermined frequency range, from all segments of the scene;

data storage means for extracting and storing data contained in the output signal provided by the linear antenna;

supplementary movement means for controllably moving the linear antenna in a further fashion, to resolve ambiguities in the data stored by the data storage means; and data processing for processing the data stored by the data storage means, to determine the frequency spectrum of substantially all segments of the scene.

2. A radiometric imager as defined in claim 1, wherein:

the supplementary movement means includes rotating means for controllably rotating the linear antenna about an axis substantially perpendicular to both the antenna axis and the rocking axis; and the rocking means and the rotating means cooperate with each other such that each conic section intersects each segment of the scene a plurality of times.

3. A radiometric imager as defined in claim 2, wherein the rotating means rotates the linear antenna over a substantially 360-degree range.

4. A radiometric imager as defined in claim 1, and further including a second frequency-dispersive linear antenna substantially similar to the first linear antenna, the first and second linear antennas being arranged in spaced, parallel relationship with each other, such that they form an interferometer for scanning the scene.

5. A radiometric imager as defined in claim 4, wherein the supplementary movement means includes means for translating the first and second linear antennas relative to the scene being scanned, the translation being in a direction substantially perpendicular to the longitudinal axes of the antennas and parallel to the scene.

6. A radiometric imager as defined in claim 4, wherein the supplementary movement means includes means for controllably rotating the first and second linear antennas about an axis parallel with the longitudinal axes of the two antennas, such that the effective spacing between the two antennas along an axis perpendicular to the direction to the scene is controllably varied.

7. A radiometric imager as defined in claim 4, wherein the supplementary movement means includes means for controllably moving the first and second linear antennas toward and away from each other, while maintaining their parallel relationship, such that the effective spacing between the two antennas along an axis perpendicular to the direction to the scene is controllably varied.

8. A radiometric imager as defined in claim 1, wherein the data processing means processes the stored data using a modified Radon transform algorithm.

9. A radiometric imager as defined in claim 1, wherein the data processing means produces a plurality of registered images of the scene, each image being based on the stored data for a unique frequency band in the predetermined frequency range.

10. A radiometric imaging method for determining the frequency spectrum of a two-dimensional scene, comprising steps of:

providing a frequency-dispersive linear antenna having a longitudinal axis, the antenna providing an output signal in accordance with radiation received along a series of conical fanbeams, wherein the fanbeams represent unique frequencies extending over a predetermined frequency range and intersect a two-dimensional scene in a series of spaced-apart conic sections;

controllably rocking the linear antenna about a rocking axis substantially perpendicular to the antenna axis and parallel to the scene, to cause the spaced-apart conic sections to scan the scene in a predetermined fashion, such that the output signal provided by the linear antenna contains data representing the receipt of all radiation in the predetermined frequency range, from all segments of the scene;

extracting and storing data contained in the output signal provided by the linear antenna;

controllably moving the linear antenna in a further fashion, to resolve ambiguities in the data stored by the data storage means; and processing the data stored in the step of extracting and storing, to determine the frequency spectrum of substantially all segments of the scene.

11. A radiometric imaging method as defined in claim 10, wherein:

the step of controllably moving includes a step of controllably rotating the linear antenna about an axis substantially perpendicular to both the antenna axis and the rocking axis; and the step of controllably rocking and the step of controllably rotating are coordinated with each other such that each conic section intersects each segment of the scene a plurality of times.

12. A radiometric imaging method as defined in claim 11, wherein the step of controllably rotating rotates the linear antenna over a substantially 360 degree range.

13. A radiometric imaging method as defined in claim 10, and further including a step of providing a second frequency-dispersive linear antenna substantially similar to the first linear antenna, the first and second linear antennas being arranged in spaced, parallel relationship with each other, such that they form an interferometer for scanning the scene.

14. A radiometric imaging method as defined in claim 13, wherein the step of controllably moving includes a step of translating the first and second linear antennas relative to the scene being scanned, the tranalation being in a direction substantially perpendicular to the longitudinal axes of the antennas and parallel to the scene.

15. A radiometric imaging method as defined in claim 13, wherein the step of controllably moving includes a step of controllably rotating the first and second linear antennas about an axis parallel with the longitudinal axes of the two antennas, such that the effective spacing between the two antennas along an axis perpendicular to the direction to the scene is controllably varied.

16. A radiometric imaging method as defined in claim 13, wherein the step of controllably moving includes a step of controllably moving the first and second linear antennas toward and away from each other, while maintaining their parallel relationship, such that the effective spacing between the two antennas along an axis perpendicular to the direction to the scene is controllably varied.

17. A radiometric imaging method as defined in claim 10, wherein the step of processing includes a step of processing the stored data using a modified Radon transform algorithm.

18. A radiometric imaging method as defined in claim 10, wherein the step of processing includes a step of producing a plurality of registered images of the scene, each image being based on the stored data for a unique frequency band in the predetermined frequency range.

* * * * *